United States Patent [19]

Damiano et al.

[11] Patent Number: 4,691,197
[45] Date of Patent: Sep. 1, 1987

[54] BLOWN FUSE INDICATOR

[75] Inventors: Michael A. Damiano, Germantown; Richard F. Schmerda, Oak Creek, both of Wis.

[73] Assignee: Eaton Corporation, Cleveland, Ohio

[21] Appl. No.: 748,106

[22] Filed: Jun. 24, 1985

[51] Int. Cl.$^4$ .............................................. G08B 21/00
[52] U.S. Cl. ................................... 340/638; 340/639; 361/104; 337/241
[58] Field of Search ............... 340/638, 639, 641, 642, 340/644, 652, 815.12–815.19; 307/252 N; 315/129, 130, 135; 323/327; 337/79, 241, 242, 265, 266, 332, 376; 335/6, 17; 361/41, 104

[56] References Cited

U.S. PATENT DOCUMENTS

| | | | |
|---|---|---|---|
| 2,471,848 | 5/1949 | Von Hoorn | 340/638 X |
| 2,610,237 | 9/1952 | Benner | 340/815.16 |
| 2,623,099 | 12/1952 | Wallace et al. | 340/639 X |
| 2,735,088 | 2/1956 | Kinzer | 340/639 |
| 3,107,350 | 10/1963 | Arrasmith | 340/815.14 |
| 3,498,131 | 3/1970 | Rickey | 340/620 X |
| 3,548,399 | 12/1970 | Monigal et al. | 340/644 X |
| 3,717,117 | 2/1973 | Stanley | 340/815.14 X |
| 3,896,423 | 7/1975 | Lindberg | 340/514 X |
| 4,001,804 | 1/1977 | Irving | 340/644 X |
| 4,382,225 | 5/1983 | Peltz | 340/639 X |

FOREIGN PATENT DOCUMENTS

| | | | |
|---|---|---|---|
| 2724358 | 11/1978 | Fed. Rep. of Germany | 337/241 |
| 729689 | 5/1980 | U.S.S.R. | 337/242 |

OTHER PUBLICATIONS

"Fuse Failure Warning" by N. Ruiz; Practical Electronics, vol. 12, No. 7, Jul. 1976, p. 593.
Advertisement entitled "Don't Be Kept in the Dark. Switch to the Cutler-Hammer K Series with BFI's.", Apr. 1985.
Advertisement entitled "New Cutler-Hammer BFI's. They're Just Looking For Trouble", May 1985.

*Primary Examiner*—James L. Rowland
*Assistant Examiner*—Jeffery A. Hofsass
*Attorney, Agent, or Firm*—D. A. Rowe; L. G. Vande Zande

[57] ABSTRACT

A solid state switching circuit for energizing a lamp (L) is connected around a fuse (12) across an AC supply for detecting a voltage differential at the opposite sides of a blown fuse and applying that differential across the control (g) and switching (c) electrodes of the solid state switch (SCR) to render the same conductive. Current limiting resistors (RL1 and RL2) are placed in the ends of wire conductors which are to be connected at opposite sides of the fuse, thereby to limit current flowing in the conductors over the entire length of the conductor, minimizing electrical shock hazard upon damage to the conductor.

27 Claims, 5 Drawing Figures

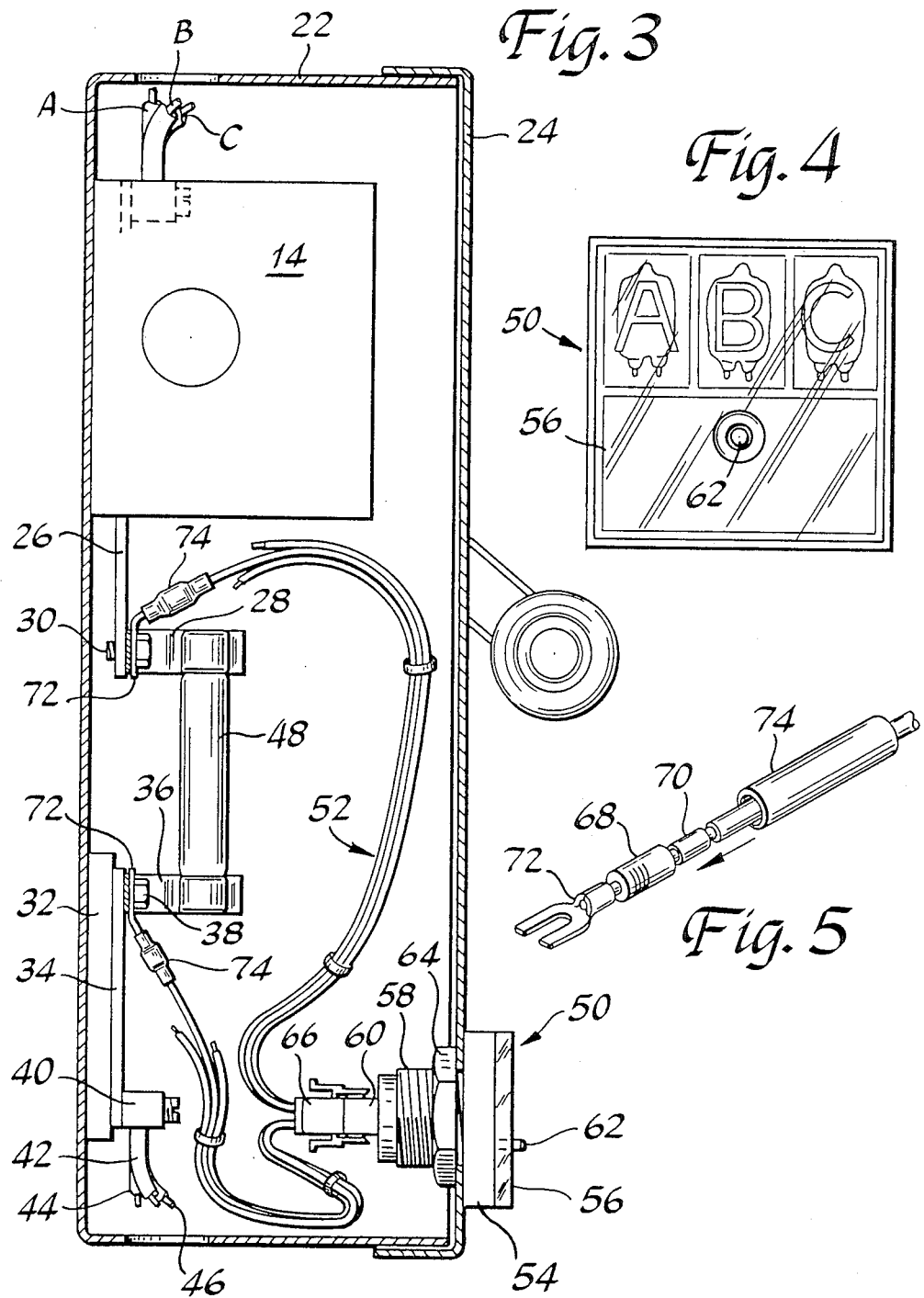

BLOWN FUSE INDICATOR

BACKGROUND OF THE INVENTION

This invention relates to signaling apparatus for indicating an open circuit condition of an electric circuit interrupter such as a blown electric fuse. More particularly, this invention relates to signaling apparatus of the aforementioned type which is used on enclosed fusible electrical apparatus and more specifically, on multiphase enclosed fusible electrical apparatus.

It is known in the art to provide a signaling device such as a lamp in series circuit with a semiconductor switch across an electrical source ahead of a fuse and to connect a control circuit for the semiconductor switch across the same source on the load side of the fuse. When the fuse blows, current flow through a control electrode and one switching electrode of the semiconductor switch renders that switch conductive for energizing the lamp to indicate the open condition of the fuse.

It is also known to provide enclosed fusible electrical apparatus with one or more low current neon lamps mounted on or through a wall of the enclosure and to provide each of these lamps with an external, high ohmic resistance for limiting current through the lamp. The lamp and external resistance are connected in parallel with the fuse and a shunting resistor is connected between opposite terminals of fuses in different phases of the protected apparatus. When a fuse blows, a circuit is completed through the shunting resistor and the respective series resistor with the lamp to energize the lamp.

The known circuits described above operate in response to detected current flow. Additionally, none of the known circuits address a potentially hazardous situation created when unprotected conductors of the indicator circuit are connected at the opposite terminals of the fuse, and particularly the conductor connected to the supply side of the fuse. If this conductor should become damaged and come into contact with a conductive portion of the apparatus, or if it is pinched in the enclosure upon closing the doors or cover thereof, the apparatus or the enclosure will be directly shorted to the supply current with no protective means for interrupting that short circuit.

SUMMARY OF THE INVENTION

The present invention provides a blown fuse indicator comprising a voltage responsive solid state switching circuit responsive to a predetermined voltage for rendering a solid state switch conducting and thereby energizing a signaling lamp when a fuse is in its open state. The conductors of the blown fuse indicator which are connected at opposite terminals of the fuse are provided with current limiting impedances immediately adjacent the fuse connections to limit current in the conductors as well as limiting the current in the blown fuse indicator circuit.

BRIEF DESCRIPTION OF THE DRAWINGS

FIG. 3 is a cross-sectional view of enclosed fusible electrical apparatus to which the blown fuse indicator of this invention is applied;

FIG. 4 is a front plan view of the blown fuse indicator of this invention; and

FIG. 5 is an isometric view of a connector and of a conductor of the blown fuse indicator of this invention.

DESCRIPTION OF THE PREFERRED EMBODIMENTS

Figure 1:
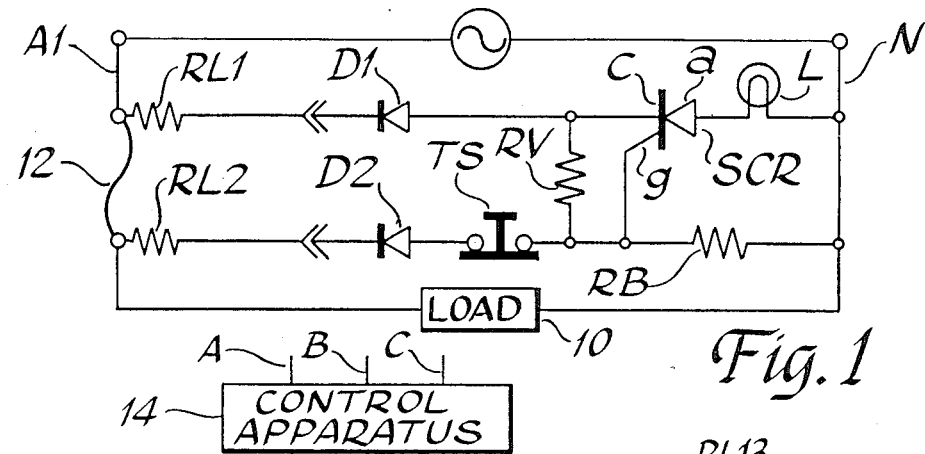
FIG. 1 is a circuit diagram of a blown fuse indicator circuit constructed in accordance with this invention.

Referring particularly to FIG. 1, the blown fuse indicator of this invention is shown embodied in a single phase, two-wire system wherein a load 10 is connected across an AC supply through an electrified wire A1 and a neutral wire N. A circuit protecting fuse 12 is connected in circuit with load 10 and conductor A1. A signaling device such as a lamp L is connected in series with the anode a and cathode c switching terminals of a solid state switch such as silicon controlled rectifier SCR across the AC supply between electrified conductor A1 and the neutral conductor N at the supply side of fuse 12. A voltage divider is also connected across the AC supply between conductors A1 and N to provide control of the solid state switching device SCR. The voltage divider has two parts, a first part comprising a biasing resistor RB connected between the gate terminal g of solid state switch SCR and conductor N. A second part of the voltage divider comprises two parallel resistive branches connected to the gate terminal g of solid state switch SCR, a first branch comprising resistors RV and RL1 series connected between the gate terminal g and conductor A1 at the supply side of fuse 12, and the second branch comprising a resistor RL2 in series with the resistance of the fuse 12 also connected between gate terminal g and conductor A1. The two branches have blocking diodes D1 and D2, respectively, connected therein to block current flow from conductor A1 to conductor N. The point common between resistor RV and diode D1 is connected to the cathode c of solid state switch SCR. Biasing resistor RB is selected to have a large ohmic resistance value with respect to the resistance value of a customary load 10, thereby to limit the current flow in the control terminal path to a negligible amount when fuse 12 is intact and load 10 is connected to the AC supply. Resistors RL1 and RL2 are current limiting resistors and have high ohmic values to limit currents in the blown fuse indicator circuit. As will be more fully brought out hereinafter, the voltage responsive solid state switching circuit and the value and the location of the current limiting resistors RL1 and RL2 is particularly significant with regard to this invention.

In operation, when the AC supply voltage is applied across conductors A1 and N, load 10 is energized. On the positive half cycle of AC supply, i.e. when conductor A1 is positive with respect to neutral conductor N, current flow is blocked in both branches of the voltage divider by the diodes D1 and D2 and is further blocked through the lamp circuit by the non-conducting solid state switch SCR which is also connected in a blocking mode. On the alternate half cycle, i.e., when conductor A1 is negative with respect to conductor N, a small amount of current will flow through the voltage divider. However, the voltage appearing at control terminal g or the voltage drop across resistor RV is insufficient to trigger the solid state switch SCR into conduction. There is effectively no difference in potential between the load side and the supply side of fuse 12, and therefore the potential at the gate g of semiconductor switch SCR is effectively the same potential as that at the cathode c thereof and the switch SCR is maintained in its non-conductive state.

In the event that fuse 12 opens, current flow is prevented in the indicator circuit during the positive half cycle when conductor A1 is positive with respect to neutral conductor N due to blocking diode D1 and because the solid state switch SCR is non-conductive and is connected in a blocking mode to current flow from the conductor A1. However, on the alternate half cycle when conductor N is positive with respect to conductor A1, the voltage at the junction of the two parts of the voltage divider with gate g increases over the voltage that initially appeared there when fuse 12 was intact. The opening of fuse 12 removes the parallel branch containing fuse 12 and current limiting resistor RL2 from the voltage divider, leaving only a single branch comprising resistors RV and RL1. This effectively increases the resistance in the second part of the voltage divider and therefore increases the voltage at the point common to the two parts of the voltage divider and gate g. Due to the large ohmic value of current limiting resistor RL1, the current in the gate-to-cathode circuit of solid state switch SCR is insufficient to trigger the switch into conduction. However, current flowing through resistor RV provides a voltage drop thereacross which is impressed across the gate-cathode of semiconductor switch SCR which is adequate to fire the semiconductor switch SCR into conduction. The conducting semiconductor switch SCR completes a circuit from conductor N, through lamp L anode a, cathode c, diode D1 and resistor RL1 to conductor A1 energize the lamp L on alternate half cycles when conductor N is positive with respect to conductor A1 to emit a visually perceived steady light. During this condition, current is prohibited from flowing through the load 10 and gate-cathode circuit of semiconductor switch SCR by blocking diode D2. It should also be recognized that the blown fuse indicator circuit will function to indicate the state of the fuse 12 irrespective of the presence of load 10.

A normally closed pushbutton switch TS may be connected in one branch of the voltage divider between resistor RL2 and the point common with the opposite branch of the voltage divider for testing the operability of the indicating circuit and of lamp L. By manually depressing switch Ts to open its contacts, the parallel branch of the voltage divider containing fuse 12 and current limiting resistor RL2 is removed from the voltage divider, thereby increasing the resistance in that part of the voltage divider and at the point common thereof with gate g of semiconductor switch SCR. In a manner similar to that just described for the open fuse condition, with the test switch TS depressed and its contacts open, a voltage across resistor RV is applied to the gate-cathode terminals of solid state switch SCR to render the switch conductive, thereby to energize lamp L on the alternate half cycles when conductor N is positive with respect to conductor A1.

Figure 2:
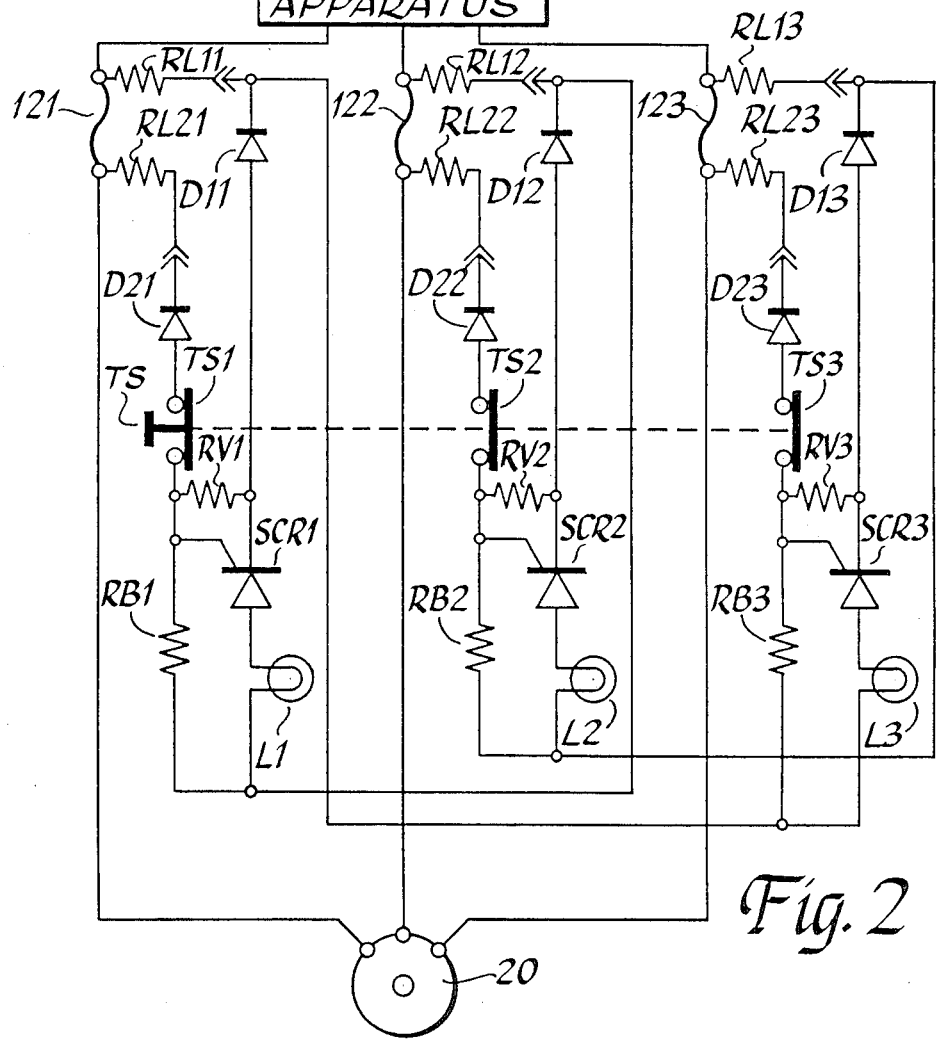
FIG. 2 is a circuit diagram illustrating the blown fuse indicator of this invention applied to a multiphase control apparatus.

A multiphase application of the indicator circuit of FIG. 1 is disclosed in FIG. 2. This arrangement may be used in enclosed control apparatus such as a manually operated safety switch, a combination starter, a motor control center unit, busway plug-in unit and the like. These various control devices are represented by rectangle 14 which is connected in the three phase AC supply lines A, B and C respectively. Each of these lines is provided with a fuse 121, 122 and 123, respectively, at the output side of the control apparatus and in the line leading to a load such as three phase motor 20. Individual indicator circuits are connected around each of the respective fuses 121, 122 and 123 in a line-to-line connection across the AC supply. Each of these indicating circuits are identical, and only one will be described in detail.

The indicator circuit for fuse 121 in line A of the FIG. 2 circuit comprises a solid state switch SCR1, lamp L1 and current limiting resistor RL11 connected across the AC supply from the supply side of fuse 121 of line A to the supply side of fuse 122 of line B through resistor RL12. A diode D11 is also connected in this circuit in a manner to block current flow from line A to line B. The control circuit for the switching device SCR1 is connected between the load, or output side of fuse 121 of line A and the supply side of fuse 122 of line B through resistor RL12. This control circuit comprises a voltage divider having two parts, the first part comprising a biasing resistor RB1 connected in parallel with lamp L1 from the supply side of fuse 122 of line B to the gate of solid state switch SCR1. The other part of the control circuit voltage divider comprises two parallel resistor branches, the first branch comprising current limiting resistor RL21 and fuse 121 connected between line A and the gate of solid state switch SCR1. The second parallel branch comprises resistor RV1 and series connected current limiting resistor RL11 connected to the supply side of fuse 121 in line A. One side of the resistor RV1 is also connected to the point common to diode D11 and the cathode of solid state switch SCR1. A diode D21 is connected in the branch containing current limiting resistor RL21 and is arranged to block current flow from line A to line B. A contact TS1 of multipole test switch TS is also connected in this branch between the diode D21 and the resistor RV1. In a manner similar to the connections just described, the indicator circuit for fuse 122 in line B is connected around the fuse to the supply side of fuse 123 in line C, and the indicator circuit connected around fuse 123 in line C is connected to the supply side of fuse 121 in line A. Each of the respective control circuits for lines B and C have contacts TS2 and TS3, respectively of the test switch TS connected in the similar location between the diode D22 or D23 and the resistor RV2 or RV3, respectively.

The operation of the indicator circuits of FIG. 2 is the same as that previously described in connection with the indicator circuit of FIG. 1. When the respective fuses 121, 122 and 123 are intact, there is effectively no difference in potential between input and output sides of the respective fuse and therefore, no effective difference in potential between the gate and cathode of the respective semiconductor switch SCR1, SCR2 and SCR3, therefore rendering these switches non-conductive. However, when either the test switch TS is depressed or a respective fuse is in its open condition, the gate of the respective semiconductor switch is raised to a higher potential than the supply side terminal of the open fuse to which the cathode of the respective switch is connected by a voltage drop impressed across a resistor RV1, RV2 or RV3 respectively, thereby rendering the respective solid state switch conducting and the associated lamp energized on alternate half cycles. With this arrangement, only the lamp associated with the open circuited fuse is energized and the blown fuse may be quickly identified and replaced. However, for convenience in testing the operability of the lamps L1, L2 and L3, and the indicating circuits associated therewith, the contacts TS1, TS2 and TS3 of the test switch are preferably ganged together whereby depression of the pushbutton of that switch will cause all three lamps to light simultaneously.

The application of the blown fuse indicator of this invention to an enclosed fusible electrical apparatus is shown in FIG. 3 wherein the control apparatus 14 is a manually operable safety or disconnect switch mounted within an enclosure 22 having a cover 24 attached thereto by a hinge (not shown). AC supply wires A, B and C extend into the enclosure 22 through an opening in a top wall thereof and are connected to the switch 14. The switch is provided with an individual bus bar 26 for each phase of the AC supply, although only one phase is shown. A fuse clip 28 is attached to the lower extremity of bus bar 26 by a screw 30. Spaced below the bus bar 26 is an insulator block 32 which is attached to the rear wall of enclosure 22. A conductor 34 is attached to the forward surface of insulator 32 and has a fuse clip 36 attached to the upper end thereof in alignment with fuse clip 28 by a screw 38. A connector 40 is attached to the lower end of conductor 34 for receiving output wires 42, 44 and 46 which extend through an opening in the lower wall of enclosure 22 for connection to a load device. A fuse 48 is inserted in the fuse clips 28 and 36.

The blown fuse indicator of this invention preferably comprises a housing assembly 50 and a separate current limiting wiring harness 52. The indicator housing assembly 50 comprises a rectangular portion 54 having a transparent plastic cover 56 secured thereto. Extending from the back side of rectangular portion 54 is a threaded cylindrical barrel 58. The lamps L1, L2 and L3 and the various components of the circuit shown in FIG. 2, with the exception of the current limiting resistors RL11-RL13 and RL21-RL23, are mounted on and between a plurality of spaced printed circuit boards as a subassembly (not shown). A female plug-in connector module 60 is affixed to the printed circuit board assembly and the entire assembly is inserted into the housing from the forward end thereof prior to attachment of transparent cover 56. The subassembly may also incorporate a pushbutton test switch which has a pushbutton operator 62 projecting through the front face of transparent cover 56 to provide the test function of test switch TS of FIG. 2. As seen in FIG. 4, the front face of cover 56 is preferably provided with indicia over each lamp which corresponds to the phase or line of the apparatus within the enclosure in which the associated fuse is connected. The indicator housing assembly 50 is mounted through a hole in the front face of cover 24 and is secured thereto by a nut 64 which is threadably received on threaded barrel portion 58. The modular approach to the indicator housing assembly 50 greatly facilitates its attachment to the enclosed switch apparatus.

The current limiting wiring harness 52 is provided with a mating connector element 66 which may be cooperatively attached to connector 60 of the indicator housing assembly 50. The wiring harness comprises a pair of wires for each fuse of the apparatus, each of the wires terminating at one end of the connector 66. The opposite ends of the wires are provided with a current limiting resistor 68 corresponding to one of the current limiting resistors RL11-RL13, RL21-RL23. As best seen in FIG. 5, resistor 68 is electrically attached to the end of the respective conductor by a crimped connector 70. A wiring connector such as crimp-on spade terminal 72 is attached to the opposite end of resistor 68. The crimped connections of connector 72 and connector 70 and the resistor 68 are covered by a heat shrink insulating tube 74. The wiring connector terminals of the harness wires are connected to the respective fuse clips 28 and 36 by inserting the wiring connector 72 between the base of the respective fuse clip 28 or 36 and the head of the respective screw 30 or 38 securing that fuse clip to the conductor 26 or 34. In this manner, the indicator wiring harness is connected in parallel around the fuse 48, but the connector elements 72 are not connected in the main current carrying path of the fuse 48 and therefore are not subject to be damaged by high currents. If preferred, the connectors 72 could also be attached at some other point along the conductors 26 and 34 by separate screws received in openings in the conductors.

The particular location of the current limiting resistor 68 immediately adjacent the ends of the conductors connected to the fuse renders the blown fuse indicator particularly safe for use within enclosed apparatus. If one of the conductors comprising the wiring harness 52 were to be pinched between some part of the control apparatus or, more likely, to become damaged by pinching between the enclosure 22 and cover 24 when the cover is being closed, the amount of current flowing in that conductor will be limited by the current limiting resistor 68 corresponding to resistors RL11-RL13 and RL21-RL23 of FIG. 2. It is preferable that the values of such resistor be selected to produce currents in the conductors in the 4-6 milliamp range recommended as a safe tripping range for personnel ground fault interruptor devices. Moreover, the voltage responsive indicator circuit of this invention enables various component values to be selected to render the current values significantly below the aforementioned range. It will be appreciated that if the current limiting resistor 68 were physically located in the indicator housing assembly 50 or closely adjacent thereto, a significant length of wire directly connected to the supply side fuse clip 28 would be exposed within the enclosure 22 and subject to inadvertent damage whereby the enclosure itself could become electrified and a hazard to personnel.

The foregoing has described a preferred embodiment of a blown fuse indicator which is operable in response to voltage differential at opposite sides of the fuse, which voltage differential is applied to a solid state switch to trigger that switch into conduction for energizing an indicating lamp, and which has its current limiting resistors mounted at the extreme ends of the wiring conductors which are connected at opposite sides of the monitored fuse to limit current flowing through the entire length of the conductor within the enclosure. It is to be understood that this invention is susceptible of various modifications without departing from the scope of the appended claims.

We claim:

1. A blown fuse indicator comprising, in combination:
   a power supply source;
   an indicator;
   a solid state switching device having a pair of switching terminals and a control terminal, said switching terminals being connected in circuit with said indicator across said source;
   a control circuit for said solid state switching device comprising:
   a voltage divider connected across said source, said voltage divider having two parts with a junction there between connected to said control terminal, one of said parts comprising two parallel branches; and a fuse connected in one of said branches effective when it opens to interrupt said one branch for raising the voltage at said junction to render said solid state switching device conductive to energize said indicator to indicate the open state of said fuse.

2. The blown fuse indicator defined in claim 1 wherein at least a portion of the other of said branches is in series circuit with said switching terminals for limiting current in said indicator circuit.

3. The blown fuse indicator defined in claim 1 wherein said one branch comprises a test switch effective when opened for raising said voltage at said junction to render said solid state switching device conductive to energize said indicator for indicating operability of said blown fuse indicator.

4. The blown fuse indicator defined in claim 1 wherein said branches each comprise current limiting impedance means for limiting current in said indicator circuit and said control circuit.

5. The blown fuse indicator defined in claim 4 wherein said current limiting impedance means are connected immediately adjacent respective opposite terminals of said fuse.

6. The blown fuse indicator defined in claim 1 wherein the other of said branches comprises an impedance connected across said control terminal and a switching terminal of said solid state switching device for bypassing current from said control terminal circuit.

7. A blown fuse indicator for enclosed fusible electrical apparatus comprising, in combination:
a power supply source;
an enclosure containing electrical apparatus and at least one fuse, said fuse being connected in circuit with said power supply source;
indicator lamp means mounted on said enclosure remote from said fuse comprising an individual lamp visible to the exterior of said enclosure for each fuse, and solid state switching means for each lamp responsive to a voltage differential at opposite sides of a blown fuse for effecting energization of a respective lamp; and
means for providing said voltage differential comprising:
pairs of wire conductors for each fuse, said conductors connected at one end to said lamp means and having a second end extending within said enclosure to opposite sides of a respective fuse, and
an impedance connected to each said conductor at said second end thereof and to a respective opposite said of said fuse immediately adjacent said fuse, said impedance limiting current in said conductor to a value safe for human contact.

8. The blown fuse indicator defined in claim 7 wherein said solid state switching means comprises:
a solid state switch having a pair of switching terminals and a control terminal, said switching terminals being connected in circuit with said lamp across said source; and
said means for providing said voltage differential at opposite sides of a blown fuse comprises a voltage divider connected across said source, said voltage divider comprising two parts with a junction therebetween connected to said control terminal, one of said parts comprising two parallel branches, and each branch comprising a respective one of said current limiting impedances.

9. The blown fuse indicator defined in claim 8 wherein said switching terminals and said lamp are in series circuit with at least a current limiting impedance portion of one of said branches.

10. The blown fuse indicator defined in claim 9 wherein the other of said branches comprises a test switch effective when opened for raising the voltage at said junction for simulating said voltage differential and rendering said solid state switch conductive for energizing said lamp.

11. A blown fuse indicator for enclosed fusible electrical apparatus comprising, in combination:
an indicator housing mounted on an enclosure for said apparatus;
individual lamp means for each fuse of said apparatus mounted in said housing and visible to the exterior of said enclosure;
solid state switching means in said housing for energizing a respective lamp in response to a blown fuse;
control means in said housing for controlling said solid state switching means;
a first member of a separable plug-in electrical connector affixed to said housing and electrically connected to said control means; and
a current limiting wiring harness comprising:
a pair of wire conductors for each fuse of said apparatus;
a second member of said separable plug-in electrical connector being electrically connected to respective first ends of said wire conductors, said second member being cooperably connected to said first member;
impedances individually connected to respective second ends of said wire conductors for limiting current in said wire conductors to values safe for human contact; and
connector means attached to said impedance for electrical connection thereof immediately adjacent opposite sides of respective ones of said fuses.

12. The blown fuse indicator defined in claim 11 wherein said current limiting impedance means comprises an electrical resistor connected in each said conductor.

13. The blown fuse indicator defined in claim 12 wherein said connector means comprise a wiring connector element connected to said resistor.

14. The blown fuse indicator defined in claim 13 wherein said connector elements of a respective pair of said wire conductors are connected on respective opposite electrical sides of said fuses outside of a main current carrying path of said apparatus.

15. The blown fuse indicator defined in claim 11 wherein said housing comprises a window in an exterior surface disposed over said lamps and having indicia thereon relating each lamp with a respective fuse.

16. The blown fuse indicator defined in claim 15 wherein a pushbutton switch actuator extends through said exterior surface of said housing, said actuator being depressible to operate switch contacts for simultaneouly testing operability of said lamps and said solid state switching means.

17. The blown fuse indicator defined in claim 11 wherein said current limiting impedance means limit current in said conductors to 6 milliamps.

18. An open circuit indicator comprising, in combination:
a power supply source;

an indicator;

a solid state switching device having a pair of switching terminals and a control terminal, said switching terminals being connected in circuit with said indicator across said source;

a control circuit for said solid state switching device comprising:

a voltage divider connected across said source, said voltage divider having two parts with a junction therebetween connected to said control terminal, one of said parts comprising two parallel branches; and circuit interrupter means connected in one of said branches effective in an open state to interrupt said one branch for raising the voltage at said junction to render said solid state switching device conductive to energize said indicator to indicate the open state of said circuit interrupter means.

19. The open circuit indicator defined in claim 18 wherein at least a portion of the other of said branches is in series circuit with said switching terminals for limiting current in said indicator circuit.

20. The open circuit indicator defined in claim 18 wherein said one branch comprises a test switch effective when opened for raising said voltage at said junction to render said solid state switching device conductive to energize said indicator for indicating operability of said open circuit indicator.

21. The open circuit indicator defined in claim 18 wherein said branches each comprise current limiting impedance means for limiting current in said indicator circuit and said control circuit.

22. The open circuit indicator defined in claim 21 wherein said current limiting impedance means are connected immediately adjacent respective opposite terminals of said circuit interrupter means.

23. The open circuit indicator defined in claim 18 wherein the other of said branches comprises an impedance connected across said control terminal and a switching terminal of said solid state switching device for bypassing current from said control terminal circuit.

24. An open circuit indicator for energizing signaling means whenever a power supply circuit is open comprising, in combination:

conductor means connected to a power supply;

interrupter means connected in said conductor means for interrupting one side of said supply;

a solid state switch having a pair of switching terminals and a control terminal, said switching terminals being connected to said conductor means across said supply at the supply side of said interrupter means;

signaling means connected in series with said switching terminals;

control means for said solid state switch connected to said control terminal and connected to said conductor means across said supply at an output side of said interrupter means for providing a voltage differential at opposite sides of an open interrupter means for rendering said solid state switch conducting and energizing said signaling means, said control means comprising impedances connected immediately adjacent said interrupter means at opposite sides thereof and wire conductors extending between said impedances and said solid state switch, said impedances limiting current in said wire conductors to values safe for human contact.

25. The open circuit indicator defined in claim 24 wherein said control means for providing a voltage differential at opposite sides of an open interrupter means comprises a voltage divider connected across said source, said voltage divider comprising two parts with a junction therebetween connected to said control terminal, one of said parts comprising two parallel branches, and each branch comprising a respective one of said current limiting impedances.

26. The open circuit indicator defined in claim 25 wherein said switching terminals and said signaling means are in series circuit with at least a current limiting impedance portion of one of said branches.

27. The open circuit indicator defined in claim 26 wherein the other of said branches comprises a test switch effective when opened for raising the voltage at said junction for simulating said voltage differential and rendering said solid state switch conductive for energizing said signaling means.

* * * * *